Jan. 13, 1970 A. R. TURQUETTE 3,489,887

DESIGN FOR MULTI-VALUED CIRCUITS

Filed May 5, 1964 5 Sheets-Sheet 1

INVENTOR:
ATWELL R. TURQUETTE
BY
Dawson, Tilton, Fallon, Lungmus & Alexander
ATT'YS INVENTOR:
ATWELL R. TURQUETTE
BY
Dawson, Tilton, Fallon, Lungmus & Alexander
ATT'YS Jan. 13, 1970 A. R. TURQUETTE 3,489,887

DESIGN FOR MULTI-VALUED CIRCUITS

Filed May 5, 1964 5 Sheets-Sheet 3

INVENTOR:
ATWELL R. TURQUETTE
BY
Dawson, Tilton, Fallon, Lungmus & Alexander
ATT'YS INVENTOR:
ATWELL R. TURQUETTE
BY
Dawson, Tilton, Fallon, Lungmus & Alexander
ATT'YS Jan. 13, 1970 A. R. TURQUETTE 3,489,887

DESIGN FOR MULTI-VALUED CIRCUITS

Filed May 5, 1964 5 Sheets-Sheet 5

INVENTOR:

ATWELL R. TURQUETTE

BY

Dawson, Tilton, Fallon, Lungmus & Alexander

ATT'YS

United States Patent Office 3,489,887
Patented Jan. 13, 1970

3,489,887

DESIGN FOR MULTI-VALUED CIRCUITS

Atwell R. Turquette, Champaign, Ill., assignor of one-fourth to Horace A. Young, Wilmette, Ill.

Filed May 5, 1964, Ser. No. 365,118
Int. Cl. G06f *7/00, 7/38*
U.S. Cl. 235—152 6 Claims

This invention relates to the design of multi-valued circuitry for use in computers and other devices employing switching circuits or the equivalent thereof.

Circuitry presently in use in such devices is based on two-valued logic. Such circuitry is limited to "all or none" situations. This limitation to only "accept" or "reject" may restrict the use of the device and, in certain cases, complicate its functioning. For example, the two-valued "nand or nor" circuitry now prevalent in the control sections of electronic computers is recognized as being limited by its "hardware" in at least two respects: (1) in the speed of operation (delay per logical level), and (2) in the packaging density—by the interconnections between components.

Because of such limitations as those above, a circuitry which could do more than "accept" or "reject" and thereby reduce the packaging density, would be desirable for problem-solving in many areas where many-valued logic can be useful, i.e., communications, information theory, war games, space research, economics, ballistics, quantum mechanics, etc. Such circuitry could produce logical nets, capable of problem-solving of great complexity which could be fabricated as an integral molecular mass.

The object of my invention is to produce circuits of a design capable of performing multi-valued functions. The principle of the invention may be stated, in general terms, as follows: The basic element of the invention is the design of circuits based on multi-valued mathematical logic. Formulae are developed for constructing circuits in machine-like fashion with outputs which are multi-valued functions of inputs. For a given choice of $M>2$, there are $M^{M^b}$ different multi-valued functions of $b$ parameters possible. This contrasts sharply with the $2^{2^b}$ possible functions of $b$ parameters of "all or none" logic. The difference between $M^{M^b}$ and $2^{2^b}$ suggests that multi-valued circuitry is capable of controlling systems of vast complexity. Such circuits can be used as primary set-ups, or can be printed or etched on circuitry boards or circuitry boxes, or otherwise reproduced.

Since the circuit designs are based on multi-valued mathematical logic, the principle of the invention is set forth in the following discussion of functional relations. The discussion encompasses two-valued logic as well as many-valued logic in order to make clear the mathematical principles on which the invention is based. In particular, the series of definitions which follow will aid in understanding the invention.

M-VALUED LOGIC

Definitions (D1) ($\alpha$) $K^1P_1P_2 = df KP_1P_2$
($\beta$) $K^{n+1}P_1P_2 \ldots P_{n+2} = df KK^nP_1P_2 \ldots P_{n+1}P_{n+2}$ where $n=1, 2 \ldots, k$.

(D2) ($\alpha$) $A^1P_1P_2 = df AP_1P_2$
($\beta$) $A^{n+1}P_1P_2 \ldots P_{n+2} = df AA^nP_1P_2 \ldots P_{n+1}P_{n+2}$ where $n=1, 2 \ldots, k$.

(D3) $\uparrow_n P_1P_2 \ldots P_{n+1} = df NK^nP_1P_2 \ldots P_{n+1}$.
(D4) $\downarrow^n P_1P_2 \ldots P_{n+1} = df NA^nP_1P_2 \ldots P_{n+1}$.
(D5) "$X$ ex $Y$" will mean that the well-formed formulas X and Y have the same truth-tables. This will be read "X has the same extension as Y."

Theorems

In what follows, it will be assumed that the truth-table of KPQ is determined by max. $(p, q)$, the truth-table of APQ is determined by min. $(p, q)$, and the truth-table of NP is determined by $M-p+1$.

(T1) $K^nP_1P_2 \ldots P_{n+1}$ ex $NA^nNP_1NP_2 \ldots NP_{n+1}$.
Proof:—Use induction on $n$.

($\alpha$) $n=1$. The truth-table of $KP_1P_2$ is determined by max. $(p_1, p_2)$ and the truth-table of $NANP_1NP_2$ is determined by $M-$min. $(M-p_1+1, M-p_2+1)+1$.

Case 1:.
$p_1 \geq p_2$: max. $(p_1, p_2)=p_1$.
min. $(M-p_1+1, M-p_2+1)=M-p_1+1$.
$\therefore M-$min. $(M-p_1+1, M-p_2+1)+1=$
$M-(M-p_1+1)+1=p_1=$max. $(p_1, p_2)$.

Case 2:
$p_1<p_2$: max. $(p_1, p_2)=p_2$.
$\therefore M-$min. $(M-p_1+1, M-p_2+1)+1=$
$M-(M-p_2+1)+1=p_2=$max. $(p_1, p_2)$.

($\beta$) Assume the theorem for $k$ and prove it for $k+1$. By (D1), $K^{k+1}P_1P_2 \ldots P_{k+2}$ ex $KK^kP_1P_2 \ldots P_{k+1}P_{k+2}$. By hypothesis of induction, $K^kP_1P_2 \ldots P_{k+1}$ ex $KNA^k NP_2 \ldots NP_{k+1}$. Hence, $K^{k+1}P_1P_2 \ldots P_{k+2}$ ex $KNAk NP_1NP_2 \ldots NP_{k+1}P_{k+2}$. By the ($\alpha$) part of the present proof $KNA^kNP_1NP_2 \ldots NP_{k+1}P_{k+2}$ *ex* $NANNA^kNP_1 NP_2 \ldots NP_{k+1}NP_{k+2}$. Since $X$ ex $NNX$, the theorem follows by (D2).

(T2) $A^nP_1P_2 \ldots P_{n+1}$ ex $NK^nNP_1NP_2 \ldots NP_{n+1}$.

Proof.—Proceed as in the proof of (T1) with A and K interchanged.

(T3) $A^{M-1}KJ_1P_1F(1, P_2 \ldots, P_b)KJ_2P_1F(2, P_2 \ldots, P_b) \ldots KJ_MP_1F(M, P_2 \ldots, P_b)$ ex $\uparrow M-1\uparrow_1 J_1P_1F(1, P_2 \ldots, P_b)\uparrow_1 J_2P_1F(2, P_2 \ldots, P_b) \ldots \uparrow_1 J_MP_1F(M, P_2 \ldots, P_b)$.

Proof.—By (T2), $A^{M-1}KJ_1P_1F(1, P_2 \ldots, P_b) KJ_2P_1F(2, P_2 \ldots, P_b) \ldots KJ_MP_1F(M, P_2 \ldots, P_b)$ ex $NK^{M-1}NKJ_1P_1F(1, P_2 \ldots, P_b)NKJ_2P_1F(2, P_2 \ldots, P_b) \ldots NKJ_MP_1F(M, P_2 \ldots, P_b)$.
The theorem follows at once by (D3).

(T4) $K^{M-1}A^{M-1}F(1, P_2 \ldots, P_b)J_2P_1J_3P_1 \ldots J_MP_1A^{M-1}F(2, P_2 \ldots, P_b)J_1P_1J_3P_1 \ldots J_MP_1 \ldots A^{M-1}F(i, P_2 \ldots, P_b)J_1P_1J_2P_1 \ldots J_{i-1}P_1J_{i+1}P_1 \ldots$ $J_MP_1 \ldots A^{M-1}F(M, P_2 \ldots, P_b)J_1P_1J_2P_1 \ldots$ $J_{M-1}P_1$ ex $\downarrow^{M-1}\downarrow^{M-1}F(1, P_2 \ldots, P_b)J_2P_1J_3P_1 \ldots J_MP_1\downarrow^{M-1}F(2, P_2 \ldots, P_b)J_1P_1J_3P_1 \ldots J_MP_1 \ldots \downarrow^{M-1}F(i, P_2 \ldots, P_b)J_1P_1J_2P_1 \ldots J_{i-1}P_1J_{i+1}P_1 \ldots J_MP_1 \ldots \downarrow^{M-1}F(M, P_2 \ldots, P_b)J_1P_1J_2P_1 \ldots J_{M-1}P_1$.
Proof.—Use (T1) and (D4).

Let the truth-table of $J_tP$, where $t=1, 2 \ldots, M$, be determined as follows:

$$j_t(p)=\begin{cases}1 \text{ if } p=t. \\ M \text{ if } P=t.\end{cases}$$

(T5). $A^{M-1}KJ_1P_1F(1, P_2 \ldots, P_b)KJ_2P_1F(2, P_2 \ldots, P_b) \ldots KJ_MP_1F(M, P_2 \ldots, P_b)$ ex $K^{M-1}A^{M-1}F(1, P_2 \ldots, P_b)J_2P_1J_3P_1 \ldots J_MP_1A^{M-1}F$-$(2, P_2 \ldots, P_b)J_1P_1J_3P_1 \ldots J_MP_1 \ldots A^{M-1}F(i, P_2 \ldots, P_b)J_1P_1J_2P_1 \ldots J_{i-1}P_1J_{i+1}P_1 \ldots J_MP_1 \ldots A^{M-1}F(M, P_2 \ldots, P_b)J_1P_1J_2P_1 \ldots J_{M-1}P_1$.

Proof.—Use a standard truth-table check. Consider the case when $P_1$ takes the value $t$ and then the case when $P_1$ takes a value different from $t$.

Let ⓣ denote a well-formed formula which always takes the truth value $t$.

(T6). Given the $MJ_tP$'s and the Mⓣ's, all possible truth-tables, of which there are $M^{M^b}$, can be translated using the same frame $A^{M-1}KJ_1P_1F(1, P_2 \ldots, P_b)\ KJ_2P_1F(2, P_2 \ldots, P_b \ldots KJ_MP_1F(M, P_2 \ldots, P_b)$.

Proof.—Use induction on the number of parameters of a truth-table. Let $b$ denote the number of parameters of a given truth-table.

($\alpha$) If $b=1$, the truth-table will be of the following form:

TABLE 1

| P | F(P) |
|---|---|
| 1 | f(1) |
| 2 | f(2) |
| . | . |
| . | . |
| i | (f)i |
| . | . |
| . | . |
| M | f(M) |

A truth-table check will show that this is the truth-table of $$A^{M-1}KJ_1P(f(1))KJ_2P(f(2)) \ldots KJ_MP(f(M))$$

($\beta$) If $b=k+1$, then $F(i, P_2 \ldots, P_{k+1})$ will denote a table of $k$ parameters. By assumption of induction, the theorem will hold for $F(i, P_2 \ldots P_{k+1})$ where $i=1, 2 \ldots M$. But a truth-table check will show that the table corresponding to $F(P_1 \ldots, P_{k+1})$ is the same as the truth table of $A^{M-1}KJ_1P_1F(1, P_2 \ldots, P_{k+1})KJ_2P_1F(2, P_2 \ldots, P_{k+1}) \ldots KJ_MP_1F(M, P_2 \ldots, P_{k+1})$.

(T7) Given the $J_tP$'s and the ⓣ's, all possible truth-tables can be translated by the frame $K^{M-1}A^{M-1}F(1, P_2 \ldots, P_b)J_2P_1J_3P_1 \ldots J_MP_1A^{M-1}F(2, P_2 \ldots, P_b)\ J_1P_1J_3P_1 \ldots J_MP_1 \ldots A^{M-1}F(i, P_2 \ldots, P_b)\ J_1P_1J_2P_1 \ldots J_{i-1}P_1J_{i+1}P_1 \ldots J_MP_1 \ldots A^{M-1}F(M, P_2 \ldots P_b)J_1P_1J_2P_1 \ldots J_{M-1}P$.

Proof.—This follows at once by (T5) and (T6).

(T8) $\uparrow_n$ denotes a basic operator such that $\uparrow_nP_1P_2 \ldots P_{n+1}$ ex $NK^nP_1P_2 \ldots P_{n+1}$, then given the $J_tP$'s and the ⓣ's, all possible truth-tables can be translated by the frame $\uparrow_{M-1}\ \uparrow_1J_1P_1F(1, P_2 \ldots, P_b)\ \uparrow_1J_2P_1F(2, P_2 \ldots, P_b) \ldots \uparrow_1J_MP_1F(M, P_2 \ldots, P_b)$.

Proof.—This follows at once by (T3) and (T6).

(T9) If $\downarrow^{M-1}$ denotes a basic operator such that $\downarrow^{M-1}P_1P_2 \ldots P_M$ ex $NA^{M-1}P_1P_2 \ldots P_M$, then given the $J_tP$'s and the ⓣ's, all possible truth-tables can be translated by the frame $\downarrow^{M-1}\downarrow^{M-1}F(1, P_2 \ldots, P_b)\ J_2P_1J_3P_1 \ldots J_MP_1\downarrow^{M-1}F(2, P_2 \ldots, P_b)J_1P_1J_3P_1 \ldots$ $$J_MP_1 \ldots \downarrow^{M-1}F(i, P_2 \ldots, P_b)J_1P_1J_2P_1 \ldots$$

$J_{i-1}P_1J_{i+1}P_1 \ldots J_MP_1 \ldots \downarrow^{M-1}F(M, P_2 \ldots, P_b)J_1P_1J_2P_1 \ldots J_{M-1}P_1$.

Proof.—This follows at once by (T4) and (T7).

Note that as with $\downarrow^{M-1}$ in (T9), $\uparrow_{M-1}$ could be used alone in (T8) by replacing $\uparrow_1XY$ by $\uparrow_{M-1}XY \ldots Y$. However, this would result in circuit redundances which can be avoided by the use of both $\uparrow_{M-1}$ and $\uparrow_1$. If such redundances are considered desirable, then it is easy to rewrite T8 with $\uparrow_1XY$ replaced by $\uparrow_{M-1}XY \ldots Y$.

The invention is described in conjunction with certain circuit diagrams, as follows.

Figure 22:
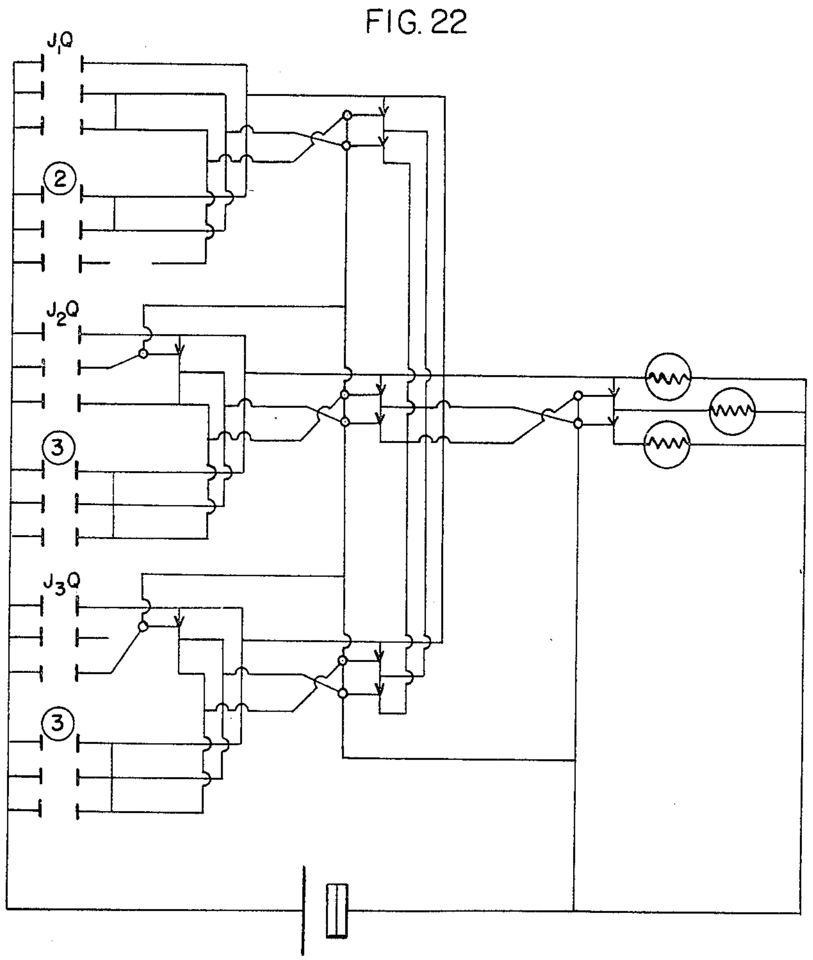
FIG. 22 is a diagram obtained through the use of a portion of Theorem 8, as is brought out more in detail hereinafter.
Figure 23:
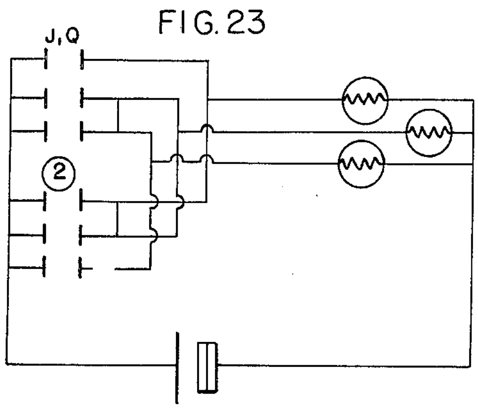
Figure 24:
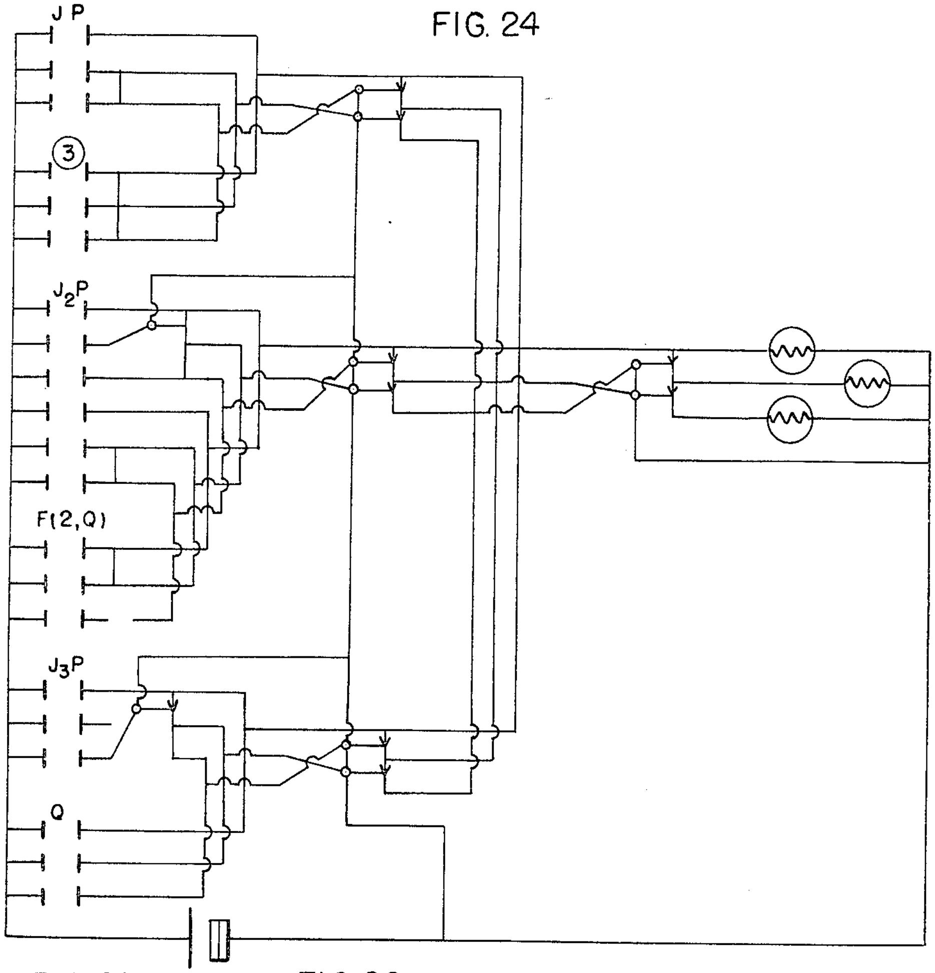
Figure 25:
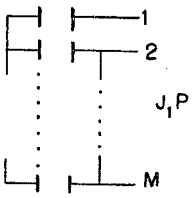
Figure 26:
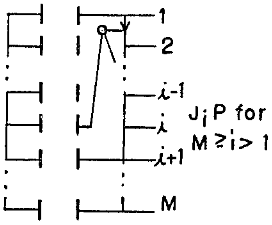
Figure 27:
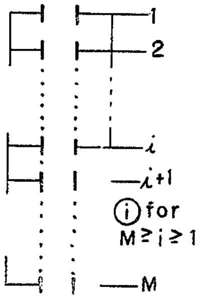
Figure 28:
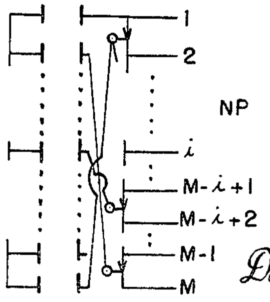

FIG. 23 constitutes a simplified version of the circuit of FIG. 22;

FIG. 24 represents a circuit diagram of an arbitrarily chosen function FPQ defined by Table 12 set forth hereinafter; and FIGS. 25–29 represent the essentials of the diagrams for the general case for any given value of M greater than 1.

The schematic diagrams just described show some typical examples of circuit systems based on the results obtained in the above section on M-valued logic. These systems become most readily apparent if existing 2-valued circuitry is first reinterpreted in terms of the above M-valued logical discussion; therefore, this standard circuitry is considered in the initial circuit diagrams.

THE STANDARD CASE OF $M=2$

The standard circuit can be interpreted as a 2-state system or automaton which exists or is alive only when the current is on (that is, a third and independent state actually exists when the circuit is in the off or de-energized condition—however, this state has no bearing whatever on the logic state or function performed by the circuit). Consequently, rather than considering the "ball or none" situation characterized by a circuit which is "broken or closed," two distinguishable live circuits will be considered simultaneously. These are such that either both are closed or a particular one is closed and no other states are possible. For example, consider FIG. 1, which illustrates such an interpretation of the standard case.

Figure 1:
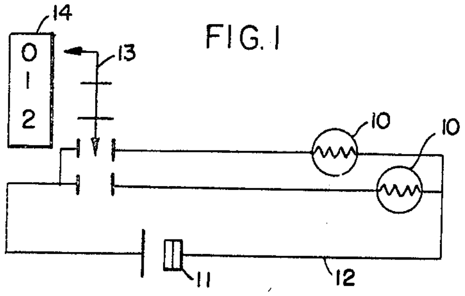
FIG. 1 is a circuit diagram for the standard case of $M=2$.

In FIG. 1, the parts of the diagram are identified as follows: The numeral 10 designates a lamp, the numeral 11 a cell, the numeral 12 a wire, the numeral 13 a 2-state switch with attached pointer, and the numeral 14 a scale for an attached pointer of a two-state switch.

It is to be understood that in FIG. 1 when the pointer is at 0, the system is dead and does not exist. When the pointer is at 1 or 2, the system is alive and exists, and consequently there is no meaningful or interpretable circuit output. That is, none of the output terminals can be energized when the pointer is at 0. When the pointer is at 1, the upper lamp is on and the lower lamp is off. This state of affairs constitutes one possible state of the system. When the pointer is at 2, both lamps are on and this situation constitutes the second possible state of the system. The first state mentioned will be called *state 1*, and the second state mentioned will be called *state 2*.

Note that if 0 is removed from the scale, the upper jumper is removed from the switch, and the upper lamp is removed from the circuit, then the diagram of FIG. 1 degenerates into a usual one for the standard case. The system is then thought of as existing in one of its possible states when it is dead and in the other when it is alive. This amounts to identifying *state 1* with "broken" and *state 2* with "closed." That is, in the degenerate case "one" plays the role similar to the role played by the "zero" in the non-degenerate case. Unless specified otherwise, the exposition which follows will be in terms of non-degenerate cases even though a slight reconstruction will make it possible to extend the theory and its results to degenerate cases.

Figure 2:
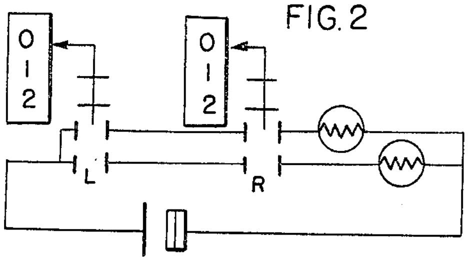
FIG. 2 is a circuit diagram which represents a series modification of that shown in FIG. 1.

With this understanding, consider the FIG. 2 series diagram. Let L denote the switch on the left and R denote the switch on the right. By FIG. 1, "Pointer reading *i*" corresponds to *state i* for $i>0$. Hence, the following state-function table can be constructed for the series diagram of FIG. 2:

TABLE 2

| L | R | L in series with R |
|---|---|---|
| State 1 | State 1 | State 1. |
| Do | State 2 | Do. |
| State 2 | State 1 | Do. |
| Do | State 2 | State 2. |

If *state i* is made to correspond to "truth-value *i*," and L and R to statement variables, then the state-function table corresponds to the truth-value function table described by min. $(l, r)$, where $l$ and $r$ denote the truth-values and L and R, respectively. That is, "L in series with R," under the given conventions, corresponds to "L or R" which is symbolized as ALR. In short, the truth-table associated with ALR is as follows:

TABLE 2A

| L | R | ALR |
|---|---|---|
| 1 | 1 | 1 |
| 1 | 2 | 1 |
| 2 | 1 | 1 |
| 2 | 2 | 2 |

Clearly this truth-table can be made to correspond to the given state-function table.

Figure 3:
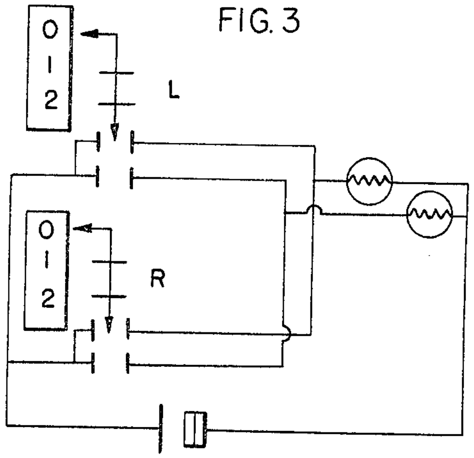
FIG. 3 is a circuit diagram constituting the parallel modification of that shown in FIG. 2.

In like fashion, max $(l, r)$, "L and R," and KLR will correspond to "L parallel to R." This will be apparent from the truth-table of KLR and the parallel diagram of FIG. 3.

TABLE 3

| L | R | KLR |
|---|---|---|
| 1 | 1 | 1 |
| 1 | 2 | 2 |
| 2 | 1 | 2 |
| 2 | 2 | 2 |

Figure 4:
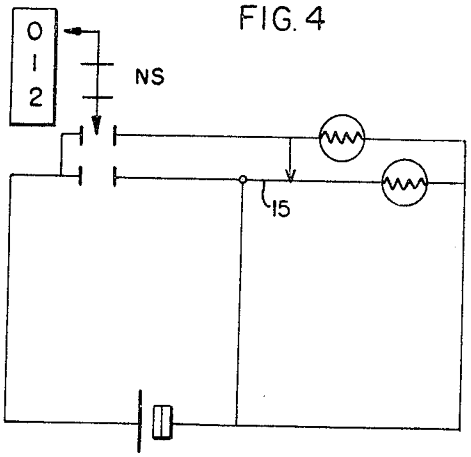
FIG. 4 is a circuit diagram of a negation circuit also representing a modification of the FIG. 1 circuit.

A negation circuit is easily constructed using an electromagnetic relay of type *b* which is closed when the current is off and open when the current is on. This new element is symbolized in the diagrams as element 15 (see FIG. 4). The convention employed in the drawing is that the type *b* relay is symbolized by a circle (representing the relay coil), a horizontal line extending to the right of the circle (representing the magnetic coupling between the coil and contacts, and not a current-carrying conductor), and a vertical line extending upwardly from the right side of the horizontal line and having an arrowlead at the right-hand terminal point of the horizontal line. The vertical line with an arrowhead at its base represents the relay contacts actuated by the coil. A current return path from the coil is also indicated by a line interconnecting the circle either with a lower circle or directly with the negative terminal of the supply voltage. In operation, the coil is energized by current flowing into the coil and through the return path; and the contacts are then open, meaning the vertical line having a lower arrowhead is broken or non-conductive. When the coil is not energized, the contacts are closed, and the vertical line is a current-conducting path. In either case current is not carried by the horizontal line. A negation circuit is illustrated by the diagram of FIG. 4. The states of the FIG. 4 system correspond to the following truth-table for negation:

TABLE 4

| S | NS |
|---|---|
| 1 | 2 |
| 2 | 1 |

Figure 5:
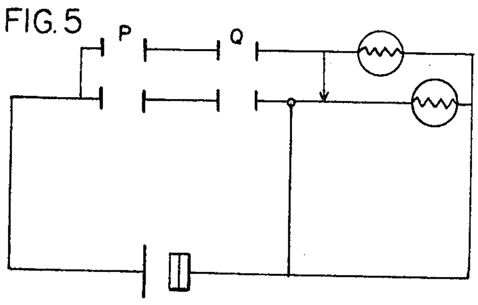
FIGS. 5 and 6 are circuit diagrams representing respectively the NOR and NAND modifications of the FIG. 1 circuit.
Figure 6:
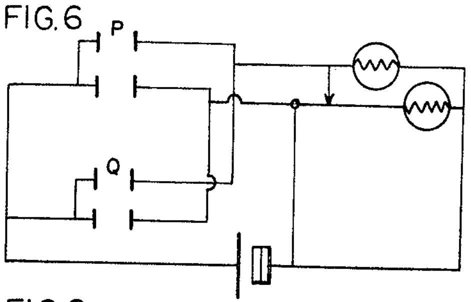

With negation available, it is easy to construct NOR and NAND circuits as illustrated respectively in FIGS. 5 and 6. These diagrams have been simplified by omitting switches and scales. The states of the system in FIG. 5 correspond to the following truth-table for NOR which will be symbolized by ↓.

TABLE 5

| P | Q | ↓PQ |
|---|---|---|
| 1 | 1 | 2 |
| 1 | 2 | 2 |
| 2 | 1 | 2 |
| 2 | 2 | 1 |

Now referring to FIG. 6, the states of this system correspond to the truth-table for NAND which will be symbolized by ↑:

TABLE 6

| P | Q | ↑PQ |
|---|---|---|
| 1 | 1 | 2 |
| 1 | 2 | 1 |
| 2 | 1 | 1 |
| 2 | 2 | 1 |

Figure 7:
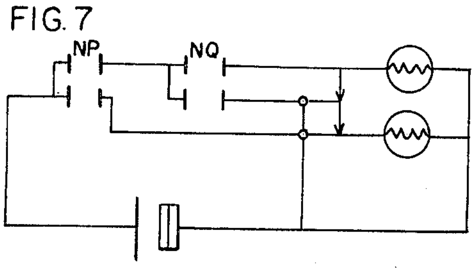
FIGS. 7 and 8 are circuit diagrams representing modifications of the diagrams of FIGS. 2 and 3 obtained by replacing P and Q by NP and NQ.
Figure 8:
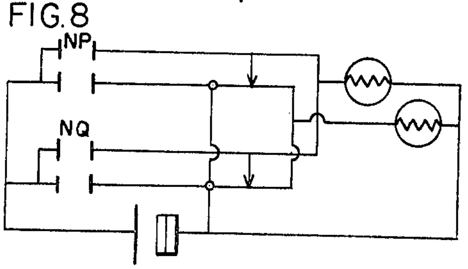

Note how NAND and NOR are obtained by replacing P and Q by NP and NQ in FIGS. 2 and 3, respectively. This is illustrated in FIGS. 7 and 8 and Tables 7 and 8 below:

TABLE 7

| P | Q | ↑PQ |
|---|---|---|
| 1 | 1 | 2 |
| 1 | 2 | 1 |
| 2 | 1 | 1 |
| 2 | 2 | 1 |

TABLE 8

| P | Q | ↓PQ |
|---|---|---|
| 1 | 1 | 2 |
| 1 | 2 | 2 |
| 2 | 1 | 2 |
| 2 | 2 | 1 |

Figure 9:
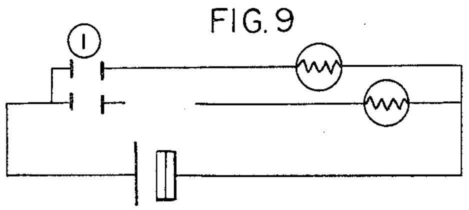
FIGS. 9 and 10 are circuit diagrams developed from a consideration of Theorems 6–9.
Figure 10:
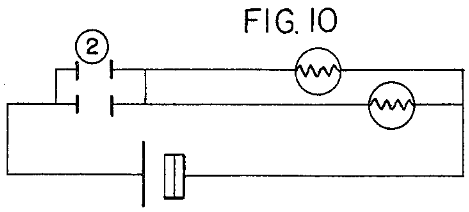

In order to generate circuit diagrams as suggested by (T6–T9), the $J_tP$'s and t's must be generated. Since $M=2$, $J_1P$ ex $P$ and $J_2P$ ex $NP$, so FIGS. 1 and 4, respectively, can be used. Clearly ① and ② can be obtained as shown in FIGS. 9 and 10 and Tables 9 and 10:

TABLE 9

| P | ① |
|---|---|
| 1 | 1 |
| 2 | 1 |

TABLE 10

| P | ② |
|---|---|
| 1 | 2 |
| 2 | 2 |

What has been said up to now has been for the purpose of illustrating elementary examples of basic circuits for use in implementing the theorems for the case of base two logic functions. Consideration is next given to a typical example of an arbitrary function which might be synthesized in base two logic. Attention is then directed to the more complicated problems of implementing truth tables in base three logic and extending these results to the generalized case of $m$-valued logic [where $m$ is an integer greater than 3]·

Now suppose a circuit diagram is desired which corresponds to the following switching function:

TABLE 11

| P | Q | FPQ |
|---|---|---|
| 1 | 1 | 2 |
| 1 | 2 | 2 |
| 2 | 1 | 1 |
| 2 | 2 | 2 |

By (T6), $FPQ$ ex $AKJ_1PF(1, Q)KJ_2PF(2, Q)$. But $J_1P$ ex $P$, $J_2P$ ex $NP$, $F(1, Q)$ ex ②, and $F(2, Q)$ ex $Q$. Therefore, $FPQ$ ex $AKP\textcircled{2}KNPQ$ and FIGS. 1, 2, 3, 4, and 10 can be used in a constructive manner to obtain a diagram of FPQ as follows:

Step 1.—Use FIGS. 3, 1 and 10 to construct a diagram for KP②.

Step 2.—Use FIGS. 3, 1 and 4 to construct a diagram for KNPQ.

Step 3.—Use FIG. 2 with the diagrams obtained by steps 1 and 2 to get a diagram for FPQ.

Figure 11:
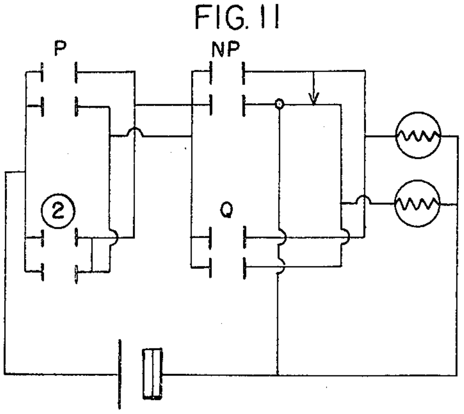
FIG. 11 is a circuit diagram based on a combination of the basic circuits of FIGS. 1, 2, 3, 4, and 10.

This series of steps gives the diagram of FIG. 11.

Figure 12:
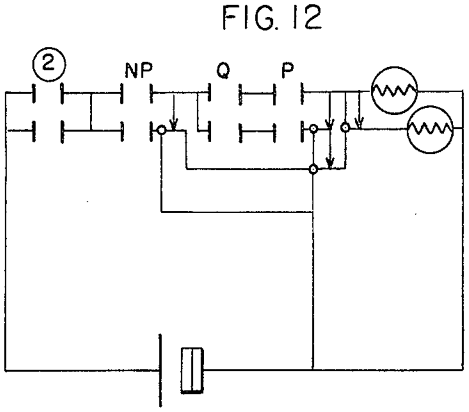
FIG. 12 is a circuit diagram developed from the employment of Theorem 9.

If (T9) were used, $FPQ$ ex $\downarrow^1\downarrow^1\textcircled{2}NP\downarrow^1QP$. Then FIG. 5 could be used to obtain the diagram of FIG. 12 for FPQ.

Figure 13:
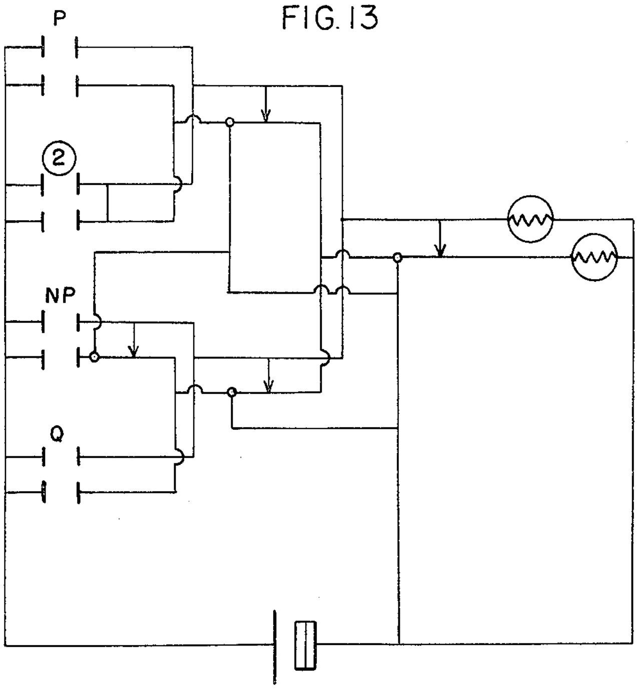
FIG. 13 is a development of the circuit diagram using Theorem 8.
Figure 14:
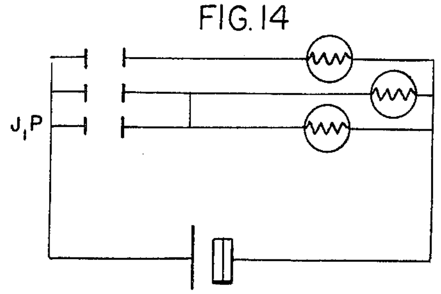
FIGS. 14–19 are circuit diagrams of certain basic elements used in the application of Theorem 8 to develop a switching circuit diagram.
Figure 15:
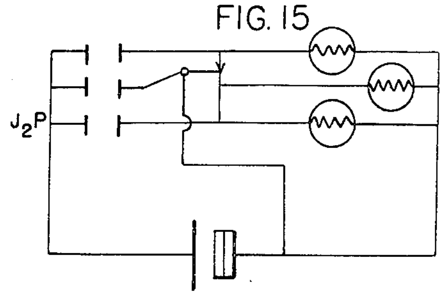
Figure 16:
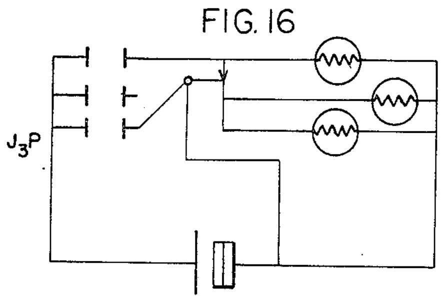
Figure 17:
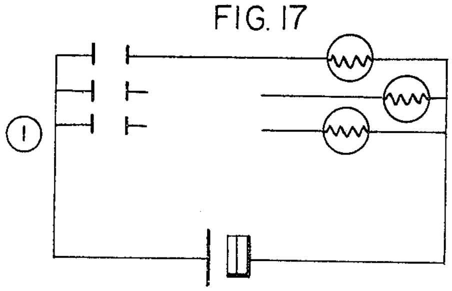
Figure 18:
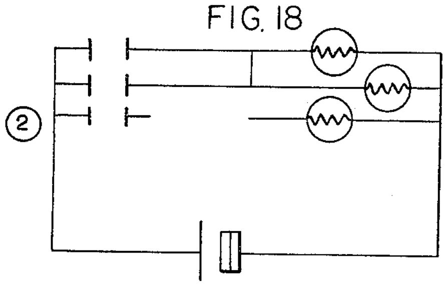
Figure 19:
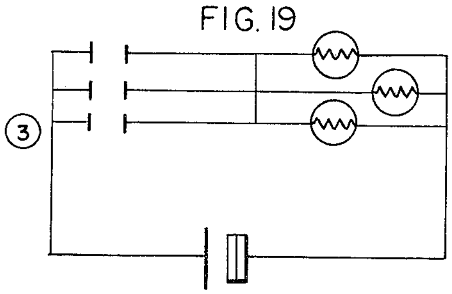

If (T8) were used, $FPQ$ ex $\uparrow_1\uparrow_1P\textcircled{2}\uparrow_1NPQ$. Then FIG. 6 gives the diagram for FPQ as indicated in FIG. 13.

If (T7) were used, a similar approach to constructive diagramming would be followed. However, (T8) yields results which are highly intuitive from the point of view of geometry. For this reason, attention will be restricted to (T8) in what follows, although the methods of construction given by (T6), (T7), and (T9) could also be used.

THE TYPICAL CASE OF $M=3$

The *parts* of diagrams are the same as for the 2-valued case except that a 2-state switch and scale is now replaced by a 3-state switch and scale. For simplification, the switches and scales are omitted from diagrams as in the 2-valued case. *States 1, 2* and *3* now correspond to the possible situations when exactly one lamp is on, exactly two lamps are on, and all three lamps are on. Since the case of $M=3$ is a strict generalization of the case $M=2$ already considered, only a generalization of FIG. 13 will be constructed by applying (T8) to the case of $M=3$. To this end, suppose the switching function FPQ is as follows:

TABLE 12

| P | Q | FPQ |
|---|---|---|
| 1 | 1 | 3 |
| 1 | 2 | 3 |
| 1 | 3 | 3 |
| 2 | 1 | 2 |
| 2 | 2 | 3 |
| 2 | 3 | 3 |
| 3 | 1 | 1 |
| 3 | 2 | 2 |
| 3 | 3 | 3 |

Again, $J_1P$, $J_2P$, $J_3P$, ①, ②, and ③ are needed. These can be constructed as seen in FIGS. 14–19.

Figure 20:
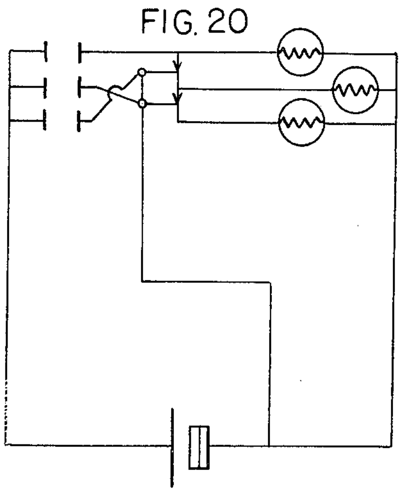
FIG. 20 is a circuit diagram of NP based upon the truth-table set forth hereinafter.

It is now helpful to diagram NP (see FIG. 20) with the following truth-table:

TABLE 13

| P | NP |
|---|---|
| 1 | 3 |
| 2 | 2 |
| 3 | 1 |

Figure 21:
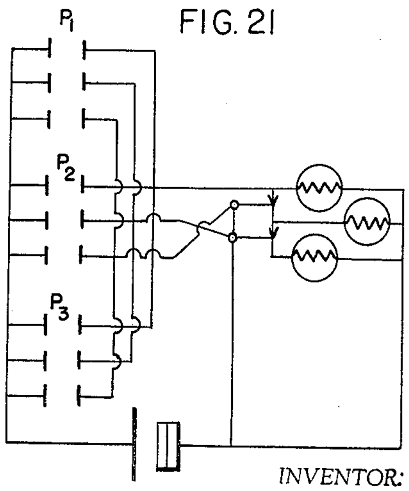
FIG. 21 is a diagram of a three-valued generalization of NAND.

Now it becomes possible to diagram a 3-valued generalization of NAND as in FIG. 21 (see also Table 14 below):

TABLE 14

| $P_1$ | $P_2$ | $P_3$ | | | $\uparrow_2P_1P_2P_3$ |
|---|---|---|---|---|---|
| 1 | 1 | 1 | | | 3 |
| 1 | 1 | 2 | | | 2 |
| 1 | 1 | 3 | | | 1 |
| 1 | 2 | 1 | | | 2 |
| 1 | 2 | 2 | | | 2 |
| 1 | 2 | 3 | | | 1 |
| 1 | 3 | 1 | | | 1 |
| 1 | 3 | 2 | | | 1 |
| 1 | 3 | 3 | | | 1 |
| 2 | 1 | 1 | | | 2 |
| 2 | 1 | 2 | | | 2 |
| 2 | 1 | 3 | | | 1 |
| 2 | 2 | 1 | | | 2 |
| 2 | 2 | 2 | | | 2 |
| 2 | 2 | 3 | | | 1 |
| 2 | 3 | 1 | | | 1 |
| 2 | 3 | 2 | | | 1 |
| 2 | 3 | 3 | | | 1 |
| 3 | 1 | 1 | | | 1 |
| 3 | 1 | 2 | | | 1 |
| 3 | 1 | 3 | | | 1 |
| 3 | 2 | 1 | | | 1 |
| 3 | 2 | 2 | | | 1 |
| 3 | 2 | 3 | | | 1 |
| 3 | 3 | 1 | | | 1 |
| 3 | 3 | 2 | | | 1 |
| 3 | 3 | 3 | | | 1 |

To diagram FPQ of Table 12, it will be necessary to first obtain F(2, Q). By (T8), F(2, Q) ex $$\uparrow_2\uparrow_1J_1Q\textcircled{2}\uparrow_1J_2Q\textcircled{3}\uparrow_1J_3Q\textcircled{3}$$

This gives the diagram of FIG. 22.

Since it may be important to emphasize the machine-like construction of circuits according to the method suggested by (T8), no attempt has been made to simplify the diagrams by inspection. If this were done in the case of F(2, Q), a much simpler diagram could be obtained, since $F(2, Q)$ ex $KJ_1Q\textcircled{2}$. Using this fact, FIG. 22 can be replaced by FIG. 23.

By (T8), $$FPQ \text{ ex } \uparrow_2\uparrow_1J_1PF(1, Q)\uparrow_1J_2PF(2, Q)\uparrow_1J_3PF(3, Q)$$

From this equation it is clear how to machine-produce a circuit diagram for FPQ. In FIG. 24, a diagram of FPQ is given which replaces FIG. 22 by FIG. 23 in the step of the construction according to (T8).

This is sufficient to illustrate the method which is perfectly general. Hence, for all other cases only the diagrams of basic circuit elements will be sketched.

THE GENERAL CASE FOR ANY GIVEN $M>1$

For the general case for any given $M>1$, only the essentials of the diagrams are given in FIGS. 25–29.

Figure 29:
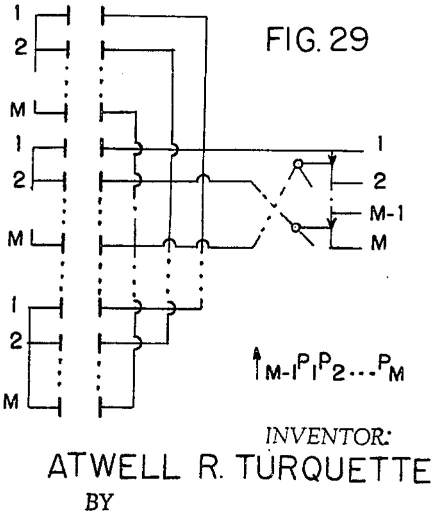

FIG. 29 for $\uparrow_{M-1}$ directs attention to the general method of construction given by (T8). The diagrams could be modified to conform to the methods of construction given by (T6), (T7), and (T9). However, as already noted, the method of construction specified in (T8) seems especially simple and intuitive when attention is directed to the machine-like production of circuits.

SUMMARY

A general method of constructing multi-valued switching circuits is derived from Theorems T6, T7, T8, and T9. Of these theorems, (T8) is especially simple and intuitive for the machine-like construction of circuits. For this reason, (T8) has been emphasized, but this does not exclude the possibility of using the other theorems—(T6), (T7), or (T9)—for the same purpose.

The formula developed in each theorem, whether it is (T6), (T7), (T8), or (*T9*), is built up in a step-by-step constructive fashion out of a small set of basic elements. The basic elements of (T6) and (T7) are the $J_tP$'s, the ⓣ's, A, and K. On the other hand, the basic elements of (T8) are the $J_tP$'s, the ⓣ's, and the $\uparrow_n$'s. Those of (T9) are the $J_tP$'s, the ⓣ's, and $\downarrow^{M-1}$ The formula developed by each theorem shows how to put together its basic elements to generate any desired M-valued functional relationship ($M>1$). In doing this, the same pattern or frame is used over and over again to achieve machine-like production. For example, if (T8) is used, the frame listed in the statement of (T8) is applied over and over again to its basic elements and what is generated thereby, and no other frames are required in order to express any desired M-valued functional relationship. Of course, additional frames for construction might be incorporated in the generating process for various purposes as illustrated in FIG. 24, but this is not necessary.

The application of the formulae given in (T6), (T7), (T8), and (T9) to systems, such as circuits, results from constructing circuits which can be associated with the basic elements and the generating frames given by the various theorems. After such circuits are constructed, then other more complex circuits can be generated from these in a manner strictly analogous to the way in which the formulae are used to generate M-valued functions.

For example, if (T8) is used, circuits must be discovered or constructed which can be associated with the basic elements $J_tP$ and ⓣ in such a way that $J_tP$ and ⓣ can be used to denote basic circuits—basic in the sense that they are the atoms of the hardware which will be used to construct other more complex circuits. Such basic or atomic circuits can be constructed as indicated in general by FIGS. 25, 26 and 27. The step-by-step pattern which can be used over and over again to construct more and more complex circuits from simpler ones is sketched for the general case in FIG. 29. A concrete example of a result of this method of construction is given in FIG. 24, which also shows how simplifying elements can be incorporated in the generating process.

If (T6) or (T7) were used in place of (T8), the only difference in the process of circuit construction would be that the circuit patterns denoted by A and K would be used to build complex circuits rather than $\uparrow_n$ which is used in (T8). If (T9) were used in place of (T8), the only difference would be that the circuit pattern denoted by $\downarrow^{M-1}$ would be used to construct complex circuits rather than $\uparrow_n$.

In each case, all that is essential is that the basic circuit elements and the pattern of operation used to put them together reflect the logical properties of the basic elements and frame of the formula stated in the theorem corresponding to the given case.

It is important to note that the circuit diagrams which have been used serve to illustrate only one type of M-state system or automaton to which the principles of the M-valued logic might apply. For example, if vacuum tubes or semi-conductors or other such elements were used in the place of relay circuits, there would be no essential changes in the logical method of construction. In fact, if M-state elements which functioned as wholes independent of the use of such parts as relays, were used to construct M-state automata, the same M-valued logical principles would apply. This would also be so regardless of whether the M-state switches were punch buttons, dials, levers, or some other device. All that is essential for the application of the M-valued logic is that the M-valued output of the given M-state automaton be a function of its M-valued input.

Through the practice of the invention, the heretofore-tolerated limitations of the bivalence approach are avoided. Even though a multi-valued circuit can be thought of as an ideal, the ever-present problem has been in the integration or combination of the various sub-circuits, i.e., basic elements, to make a package conveniently useful by the computer artisan. This stumbling-block is avoided through the utilization of Theorems 6–9, with the result that it is now possible to design and mechanically produce M-state circuitry or M-state systems (automata), the outputs of which are M-valued functions of the inputs. Alternatively, this can be viewed as a way of handling in manageable and controllable fashion M-valued circuit nets and M-state systems (represented herein by means of geometrical diagrams). Without the use of these general formulae, there was no practical way of representing in a controllable fashion the complex circuit nets and systems which defy either geometric or imaginative representation and control.

While in the foregoing specification a detailed description of the invention has been set down for the purpose of explanation, variations in the details herein given may be made by those skilled in the art without departing from the spirit and scope of the invention.

I claim:

1. A circuit for implementing a predetermined state-function table of a number, M, input variables comprising:

a number, M, input circuit means each having a number, M, output terminals, said input circuit means energizing predetermined ones of said output terminals representative of a logic state assumed by said input circuit means and determined by the independent states of said input variables;

a number, M, discrete output-signal receiving means;

a number, $M-1$, binary gating devices, each of said gating devices connecting a first signal-receiving means of lower order with a second signal-receiving means of the next higher order when in one binary state and disconnecting said first and second signal-receiving means when in the other binary state;

a number, M, connecting means, one of said connecting means coupling the first output terminals of the lowest order of all of said circuit means to the first of said output signal-receiving means, and each subsequent connecting means coupling the next order output terminals of all of said circuit means to actuate a corresponding gating device in reverse order;

whereby when the *i*th order of one of said circuit means is energized, said signal-receiving means are energized by said gating means up to the order $M-i+1$.

2. The circuit of claim 1 wherein at least one of said input circuit means is a negation circuit comprising:

a number, $M-1$, binary gating devices, each for connecting a first of said output terminals of lower order to a second of said output terminals of next higher order when in one binary state and for disconnecting the same when in the other binary state;

a number, M, of binary circuit means each having an output terminal and arranged in order to represent the separate states of said negation circuit; and a number, M, connecting means, one of said connecting means coupling the output terminal of the lowest order of said binary circuit means to the first of said output terminals of said negation circuit, each subsequent connecting means coupling succeeding output terminals of said binary circuit means to the gating lead of a corresponding gating device in reverse order.

3. The circuit of claim 1 wherein said M input circuit means further comprise:

a number, M, of input terminals each associated with one of said M output terminals, all of said input terminals coupled in common to complete an electrical circuit; and a plurality, M, of switches each interposed between an associated pair of input and output terminals of said input circuit means;

whereby the states of said switches are representative of the states of said input variables and the energizing of said output terminals of said input circuit means represents the logic state of said input circuit means.

4. The circuit of claim 1 wherein at least one of said input circuit means is an assertion circuit of order $i$ comprising:

a number, M, of switches each having an output terminal;

first connecting means for directly coupling the output terminal of a first of said switches to the lowest order output terminal of said input circuit means; second connecting means for connecting in parallel all of said output terminals of said input circuit means except for the lowest order;

binary gating means for connecting the output terminal of the lowest order of said switches in parallel with the remaining of said output terminals of said input circuit means when in one binary state and for disconnecting the same when in the other binary state; and third connecting means for coupling the output terminal of said $i$th switch to set said gating means into said other of said binary states when said $i$th switch is actuated; fourth connecting means for connecting the output terminals of order $i+1$ to the corresponding output terminals of said input circuit means;

whereby all of the output terminals of said assertion circuit are energized except when the said $i$th switch is activated, and only the lowest order of said output terminals is energized when said $i$th switch is activated.

5. The circuit of claim 1 wherein at least one of said input circuit means is a constant circuit of order $i$ comprising:

a number, M, switches representing inputs of said constant circuit each having an output terminal;

first connecting means for connecting only each of the output terminals of said switches of order up to and including $i$ to a corresponding output terminal of said input circuit means; and second connecting means for coupling all of the output terminals of said switches of order up to and including $i$ in parallel.

6. The circuit of claim 1 wherein at least one of said input circuit means is an assertion circuit comprising:

a number, M, switches each having an output terminal directly coupled to a corresponding output terminal of said input circuit means; and connecting means connecting in parallel all of said output terminals of said switches except the one of lowest order.

References Cited

UNITED STATES PATENTS

| | | | |
|---|---|---|---|
| 2,923,476 | 2/1962 | Ketchledge | 340—146.2 |
| 3,233,085 | 2/1966 | Lawlor | 235—164 |

MALCOLM A. MORRISON, Primary Examiner

U.S. Cl. X.R.

235—164; 328—158